United States Patent [19]

Dotson

[11] Patent Number: 5,040,307
[45] Date of Patent: Aug. 20, 1991

[54] MEASURING AND SCORING DEVICES FOR HORSESHOE PITCHING GAME

[76] Inventor: Gary D. Dotson, 3105 Bay Blvd., NE., Palm Bay, Fla. 32905

[21] Appl. No.: 518,921

[22] Filed: May 4, 1990

[51] Int. Cl.⁵ .................................................. G01B 3/04
[52] U.S. Cl. ........................................ 33/700; 33/485; 33/501; 33/483
[58] Field of Search .................. 273/427; 33/200, 770, 33/768, 289, 501.05, 501, 571, 662, 679.1, 483–494, 809, 574, 666, 679, 828, 827, 575, 660, 1 R, 1 B, 1 C, 27.03, 733, 810, 832, 833, 520

[56] References Cited

U.S. PATENT DOCUMENTS

| | | | |
|---|---|---|---|
| 679,662 | 7/1901 | Almorth | 33/494 |
| 846,006 | 3/1907 | Bryson | 33/1 B X |
| 1,102,436 | 7/1914 | Richardson | 33/770 |
| 3,343,265 | 9/1967 | Puerta | 33/27.03 |
| 3,406,460 | 10/1968 | Colwell | 33/41.1 X |
| 4,399,614 | 8/1983 | Kertz | 273/427 X |

Primary Examiner—Harry N. Haroian

[57] ABSTRACT

Inaccuracies in measurement of the separation of a pitched horseshoe from a target stake are substantially reduced by a measuring device that is configured to engage the target stake such that surface anomalies in the stake do not influence the accuracy of the measurement. The measuring device is comprised of a generally elongated solid body having a generally circular aperture adjacent one end of the body, the diameter of the aperture exceeding the width of the target stake, so that the device may be placed over the stake and a far edge portion of the aperture, that is adjacent to the one end of the body, may abut against that portion of the stake which faces away from the pitching direction. A sequence of gradation markings are formed on a second portion of the flat body, which is spaced apart from the one end of the body. In accordance with a further aspect of the present invention there is provided a scoring device for providing an indication of the score of the game during the progress of the game. The device preferably comprises a body of generally flat material, one surface of which has a plurality of holes, the holes being sized to receive insertable and removable peg-type elements respectively associated with participants of the game. A sequence of numerical scoring (numbers) are successively placed on the surface in alignment with the holes so that placement of a peg-element in a hole indicates the score of a respective game participant.

9 Claims, 8 Drawing Sheets

MEASURING AND SCORING DEVICES FOR HORSESHOE PITCHING GAME

FIELD OF THE INVENTION

The present invention relates in general to the game of horseshoe pitching and is particularly directed to device for indicating the score of the game among multiple participants and a device for measuring the separation of a pitched horseshoe and the toss stake.

BACKGROUND OF THE INVENT

Scoring in the game of horseshoes is based upon how close to a vertical 'toss' or 'pitch' target stake a horseshoe is pitched by a game participant from a pitching location. The stake is typically comprised of a metal bar or rod, usually have a diameter on the order of one inch, that has been driven into the ground so that it will withstand the impact of a horseshoe tossed by a participant. While the objective is to toss a 'ringer' in which the horseshoe surrounds the stake, it is frequently the case that the tossed horseshoe comes to rest a distance from the stake. In order to score the game it is necessary to measure this distance, so that it can be determined which of plural tossed horseshoes by different participants is closest to the stake. In competition events the precision to which this distance is measured is of paramount importance and may be influenced by conditions of the target area.

In particular, determining which tossed horseshoe is closest to the stake is commonly carried out by placing one end of a measuring ruler (e.g. a twelve inch ruler) against the stake and adjusting the ruler's radial direction around the stake until the closest edge of the horseshoe is located and then reading off the distance on the ruler. Obviously, such a measurement scheme is less than ideal and is especially susceptible to inaccuracies when the end of the ruler is placed against a portion of the stake that is subject to continued abuse by impact of the pitched horseshoes, which creates gradual abrasive wear including nicks and grooves in the surface of the stake facing the participant. On the other hand, the backside of the stake, namely that side which faces away from the direction from which a horseshoe is pitched, will remain substantially unworn and thereby maintains a reasonably consistent cylindrical shape.

SUMMARY OF THE INVENTION

In accordance with the present invention, inaccuracies in measurement of the separation of a pitched horseshoe from a target stake are substantially reduced by a measuring device that is configured to engage the target stake such that surface anomalies in the stake do not influence the accuracy of the measurement. In particular the measuring device according to the present invention is comprised of a generally elongated solid body having a generally circular aperture adjacent one end of the body, the diameter of the aperture exceeding the width of the target stake so that the device may be placed over the stake and a far edge portion of the aperture, that is adjacent to the one end of the body, may abut against that portion of the stake which faces away from the pitching direction. A sequence of gradation markings are formed on a second portion of the flat body, which is spaced apart from the one end of the body. The sequence of gradation markings extend along a line that intersects the aperture and delineate the distance from the near or pitching side of the stake, when the far edge portion of the aperture abuts against the stake.

Preferably, the thickness of the device exceeds the vertical width of a nick or groove that may be formed in the surface of the stake as a result of the impact of a pitched horseshoe. In one embodiment, the device has an elongated slot that extends from the aperture along the direction of the gradation markings. It may also be made of generally translucent material so as to facilitate alignment of the gradation markings with that edge of a pitched horseshoe which is closest to the stake. In its elongated shape the device has a pair of side edges that extend generally parallel to the line of gradation markings, which themselves extend to the side edges. In a further embodiment, the width of the second portion of the body is less than its one end, with the gradation markings extending across the second portion of the body and intersecting each side.

In accordance with a further aspect of the present invention there is provided a scoring device for providing an indication of the score of the game during the progress of the game. The device preferably comprises a body of generally flat material, one surface of which has a plurality of holes, the holes being sized to receive insertable and removable peg-type elements respectively associated with participants of the game. A sequence of numerical scoring indicia (numbers) are successively placed on the surface in alignment with the holes so that placement of a peg-element in a hole indicates the score of a respective game participant. In one embodiment the holes are arranged in at least one linear row and specified ones of the indicia (e.g. the numbers '11' and '21') associated with prescribed scoring conditions of said game are configured differently (e.g. larger) than other scoring indicia. The holes may be arranged in other patterns. Such as a circular pattern and the peg-type elements ma be of different colors in association with different participants of the game.

DETAILED DESCRIPTION

Figure 1:
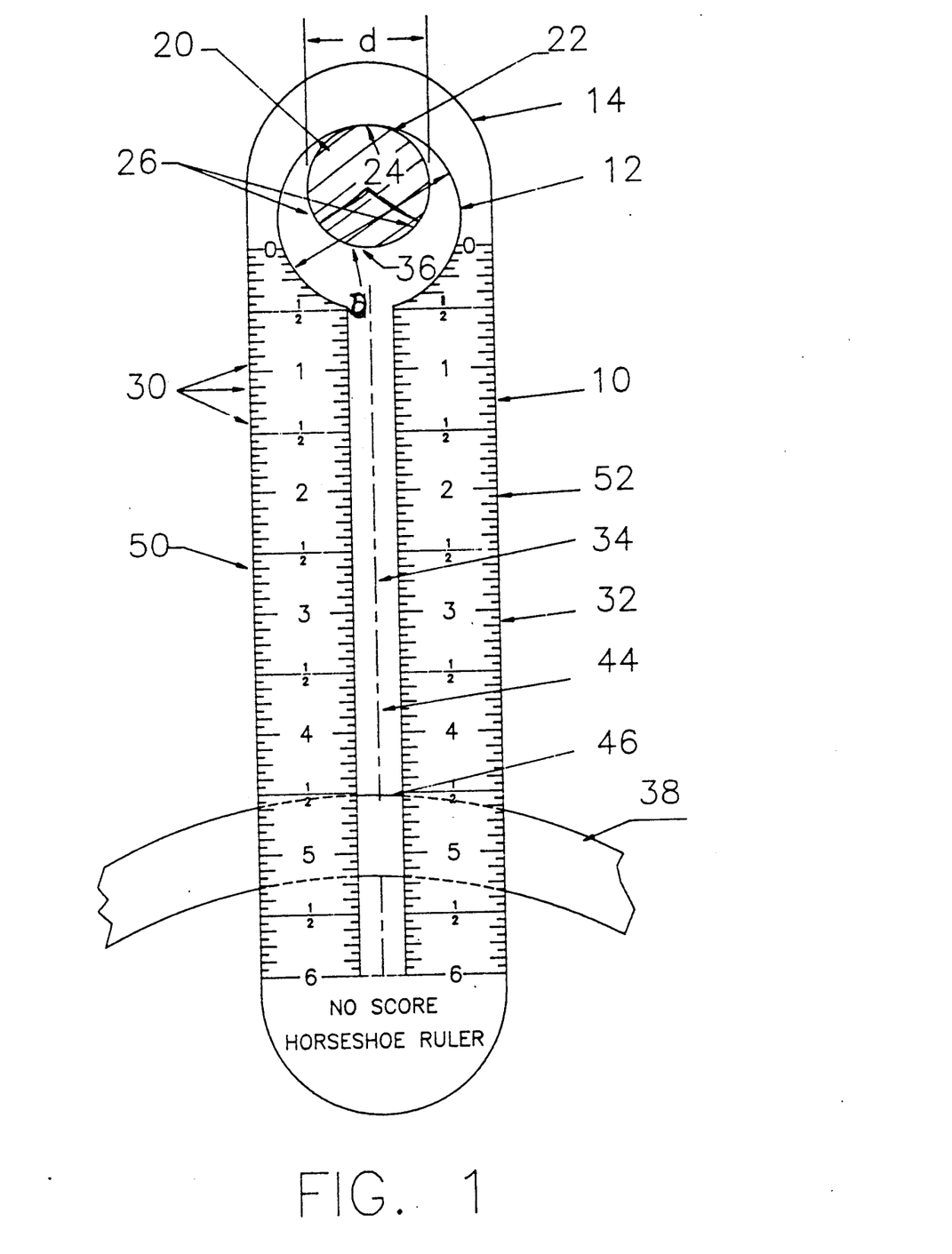
FIG. 1 is a top view of a first embodiment of a measuring device in accordance with the present invention.

Referring now to FIG. 1, a top view of a first embodiment of a measuring device in accordance with the present invention is shown as comprising a generally elongated flat, solid body 10 of a material having a generally circular aperture 12 adjacent to one end 14 of the body. The material is preferably a translucent plastic, but may be made of other materials such as metal or wood. The diameter 'D' of aperture 12 is larger than the diameter 'd' of a target stake 20, so that the device may be placed over the stake and a far or back edge portion 22 of the aperture may abut against that portion 24 of the stake 20 which faces away from the pitching direction. By back edge portion of the stake is meant that portion which can generally be expected to receive no direct impact from a pitched horseshoe so that its surface remains effectively continuous. On the other hand, that part of the stake which faces the pitching direction may encompass an exposure angle, denoted by shaded region 26, on the order of 120° and, as a result of continuous use, usually contains a number of nicks and grooves that may make measurements taken from the 'front' side of the stake inaccurate.

A sequence of gradation markings 30, which may be in any suitable units such as English (inches) or metric (centimeters),* are formed on a second portion 32 of the body 10, spaced apart from the one end 14 of the body. The sequence of gradation markings 30 extend along a line 34 that intersects aperture 12 and delineate the distance from the near side 36 of the stake to a pitched horseshoe 38, when the far edge portion 22 of the aperture abuts against the back portion 24 of the stake.

Figure 2:
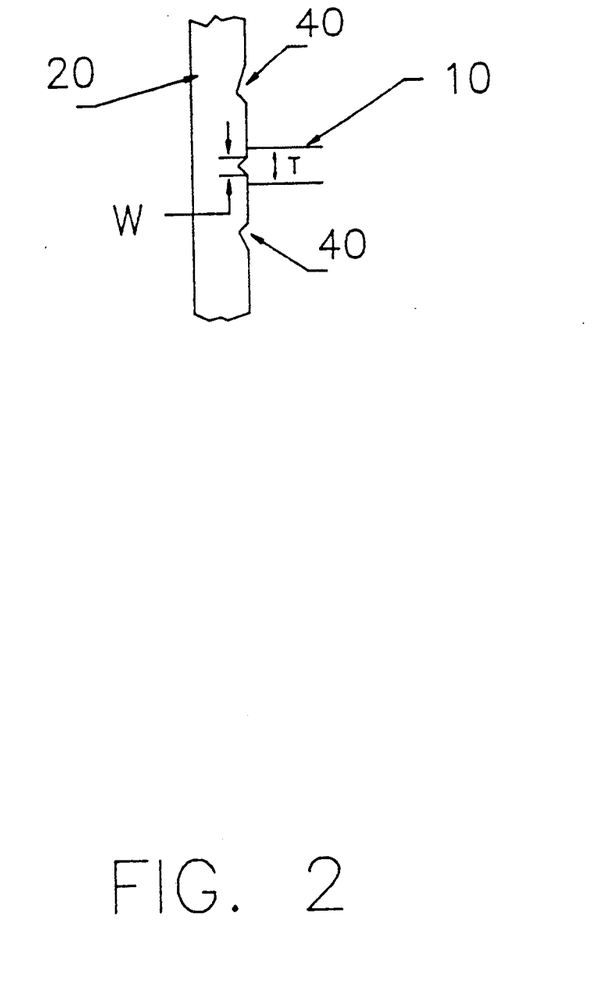
FIG. 2 diagrammatically shows the thickness of the measuring device exceeding the vertical width of a nick that may be formed in the surface of a target stake.
Figure 3:
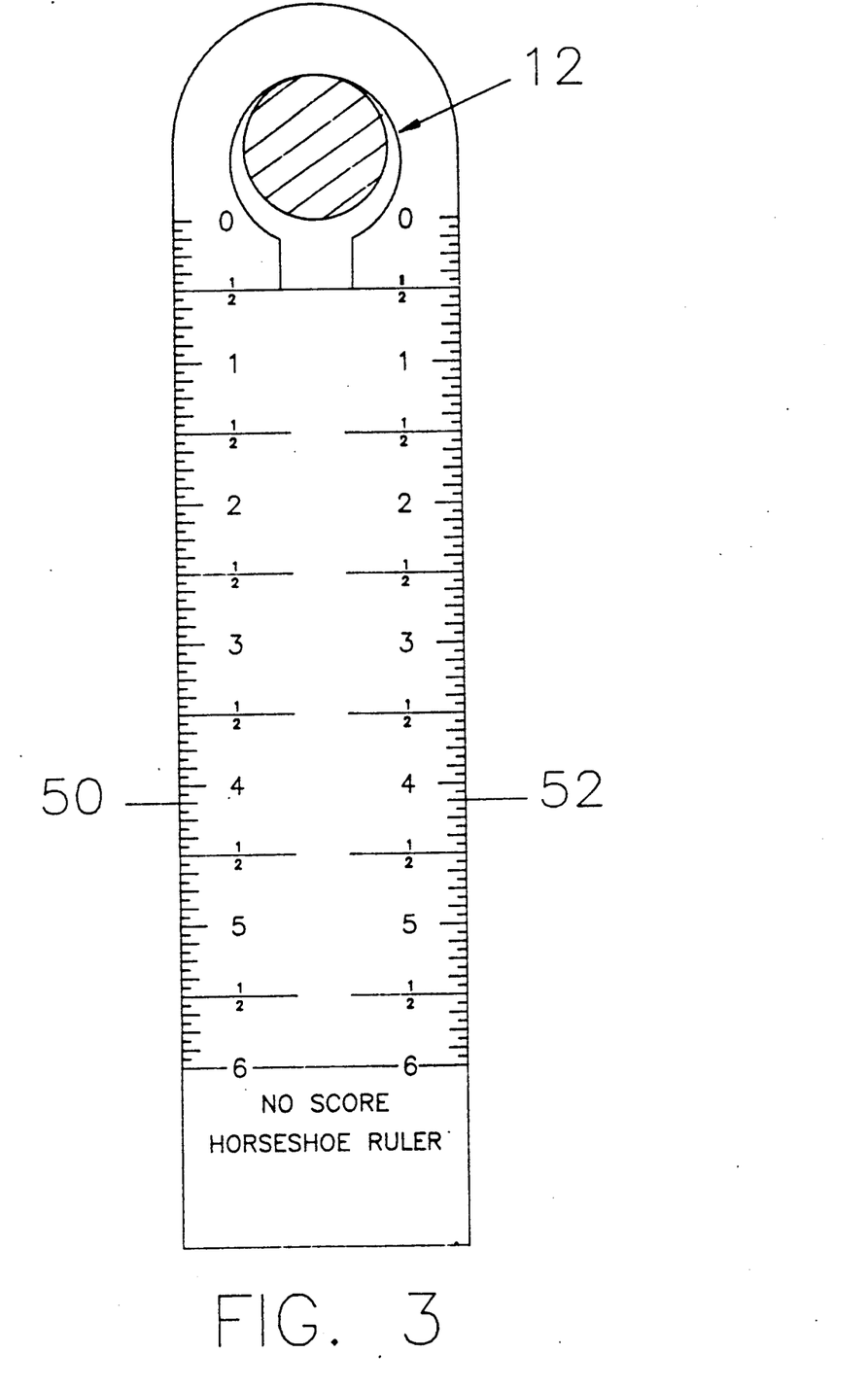
FIG. 3 is a top view of a second embodiment of a measuring device in accordance with the present invention.
Figure 4:
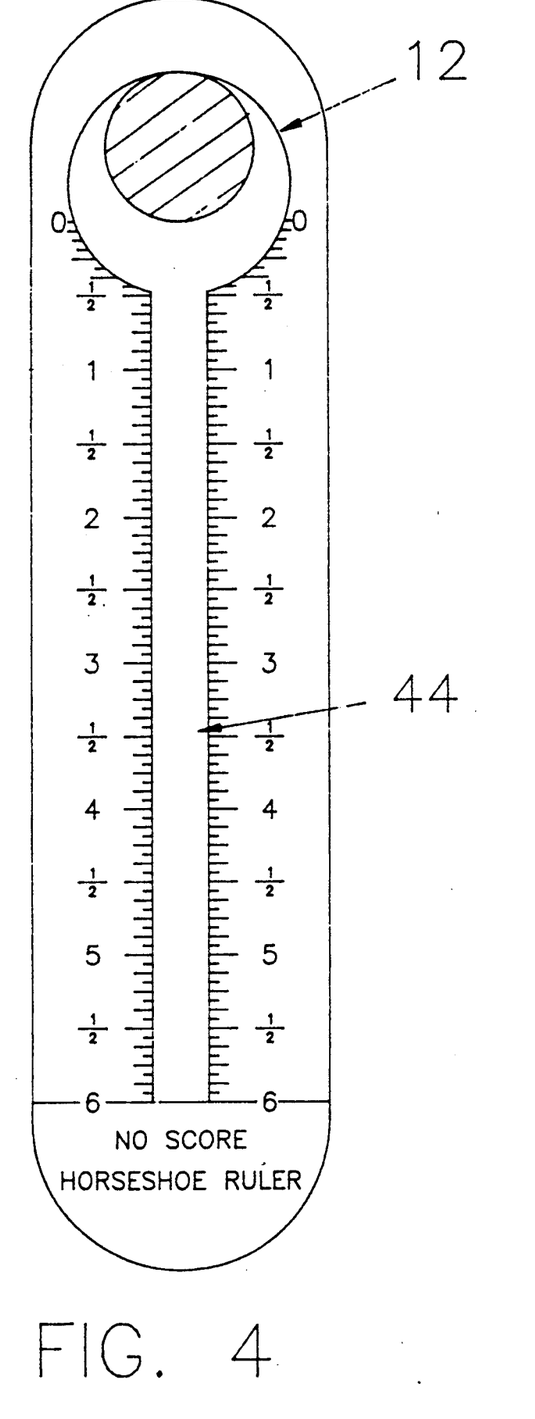
FIG. 4 is a top view of a third embodiment of a measuring device in accordance with the present invention.

Preferably, as diagrammatically shown in FIG. 2, the thickness T of the body 10 exceeds the vertical width W of a nick or groove 40 that may be formed in the surface of the stake as a result of the impact of a pitched horseshoe. In the embodiment shown in FIG. 1, the measuring device has an elongated slot 44 that extends from aperture 12 along the direction 34 of the gradation markings 30. However, the body may be formed without such a slot, as illustrated in FIG. 3. As noted earlier, although opaque materials may be used, the body is preferably made of generally translucent plastic, so as to facilitate alignment of the gradation markings 30 with that edge portion 46 of a pitched horseshoe 38 which is closest to the stake. In the elongated configuration shown in FIGS. 1 and 3, the body has a pair of side edges 50, 52 that extend generally parallel to the line of gradation markings, which themselves extend to the side edges. However, where a slot is employed, the markings may extend only to the slot, as shown in FIG. 4, rather than to the sides and the slot as shown in FIG. 1.

Figure 5:
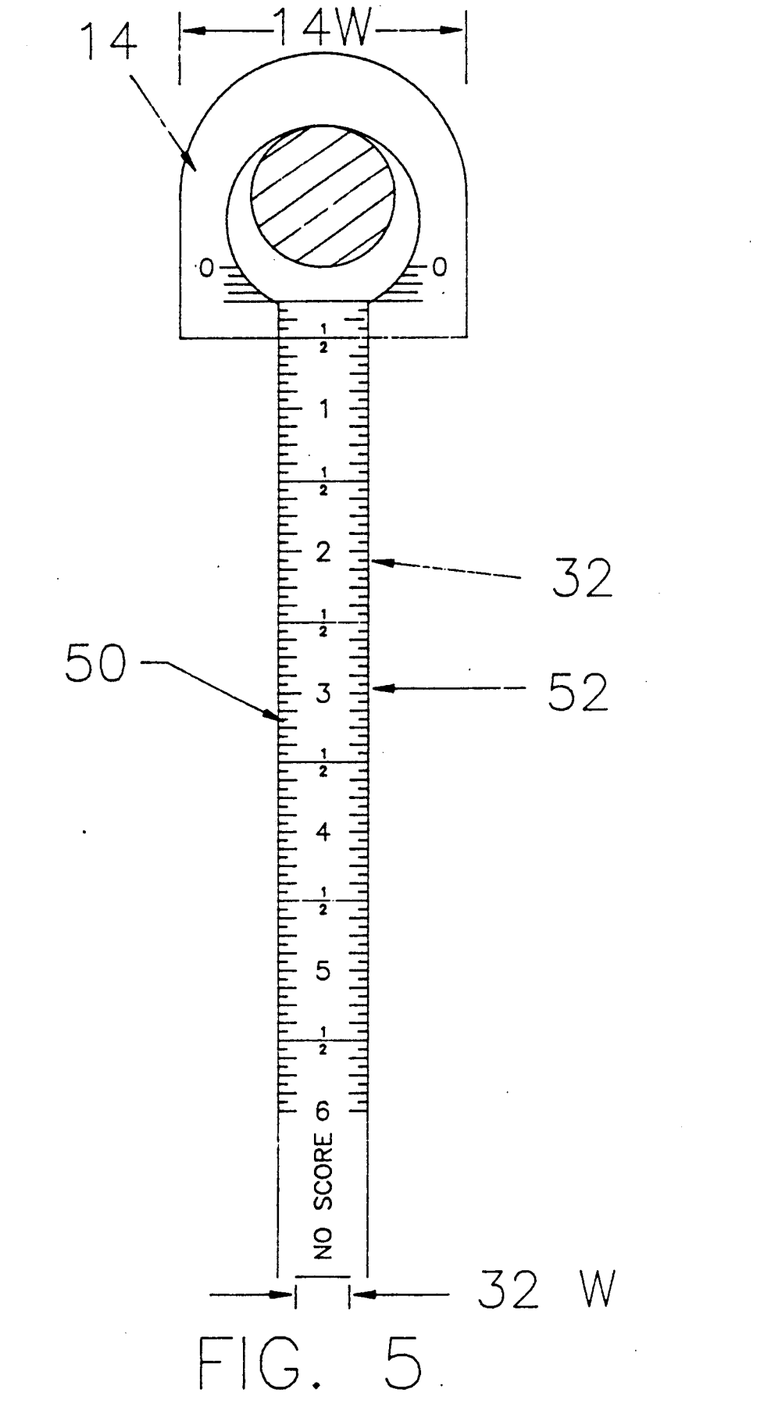
FIG. 5 is a top view of a fourth embodiment of a measuring device in accordance with the present invention.

In a further embodiment, shown in FIG. 5, the width 32W of the second portion 32 of the body is less than that 14W of its one end 14, with the gradation markings 30 extending completely across the second portion 32 of the body and intersecting each side 50 and 52. In this embodiment, the reduced width 32W of portion 32 provides a measurement precision similar of the use of the slot in the embodiment shown in FIGS. 1 and 4.

Figure 6:
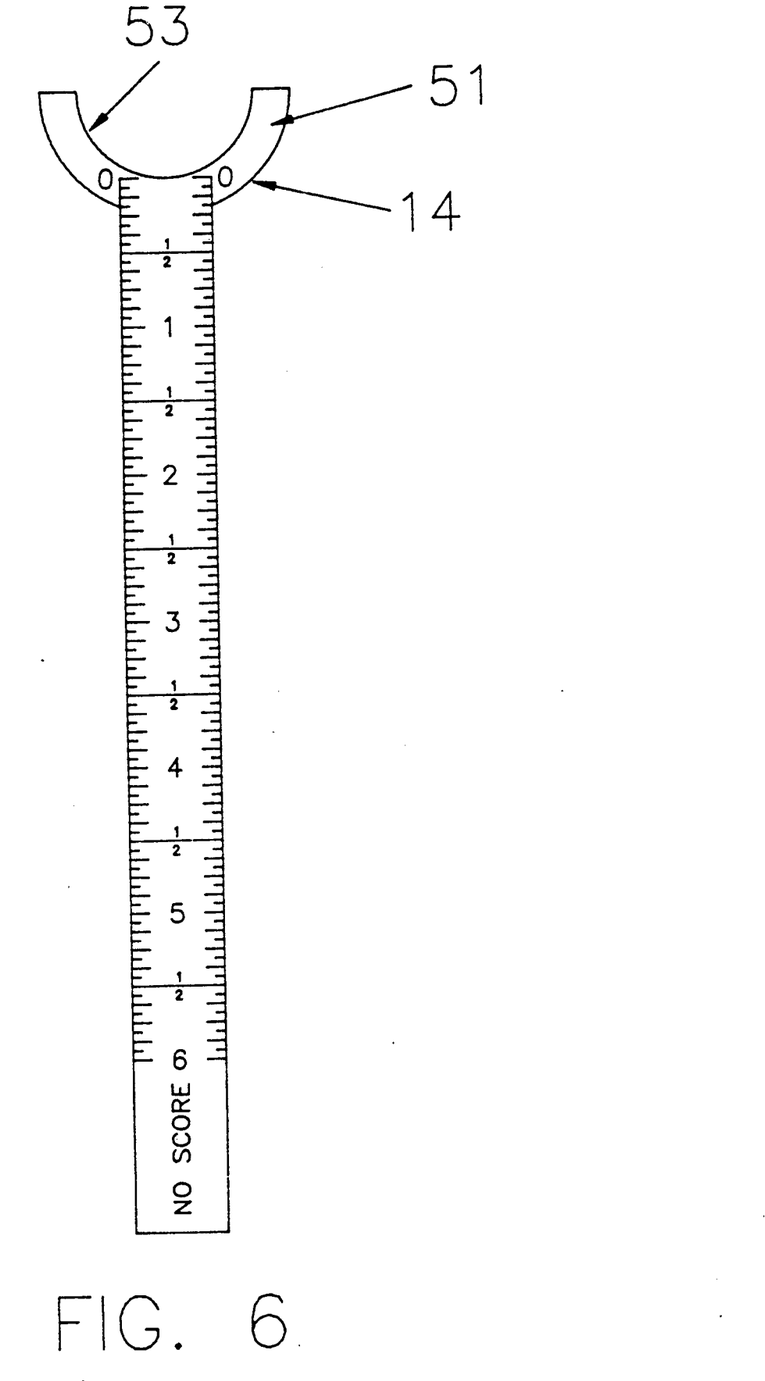
FIG. 6 is a top view of a fifth embodiment of a measuring device in accordance with the present invention.

Although the foregoing description addresses the increased precision that is attainable by measuring stake-to-horseshoe distance from the backside of the stake, where the thickness of the device is maintained sufficiently thick to extend across discontinuities in the front of the stake or a 'non-competition' measuring device is desired, a configuration of a further embodiment of the invention shown in FIG. 6 may be employed. Here, the one end 14 of the stake is semicircular-shaped element 51 having a semicircular edge 53 that is placed against the 'front' of the stake, with distance measurements taken along gradation markings 32a in the foregoing embodiments. Because the thickness of the body is greater than the vertical width of a nick, as shown in FIG. 2, referenced previously, the 'measurement' edge 53 of the device will not be placed in a groove and result in an inaccurate measurement.

Figure 7:
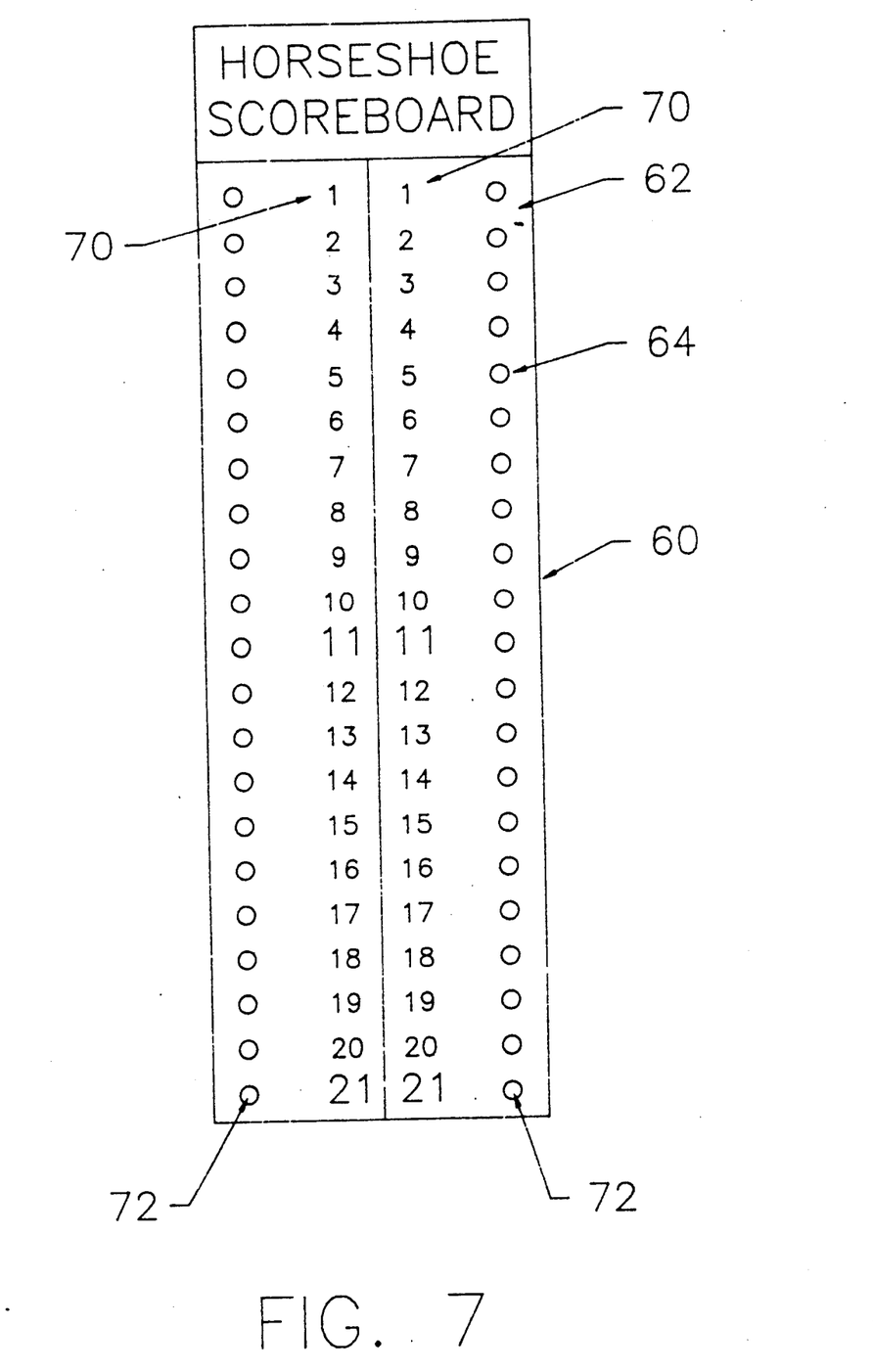
FIG. 7 shows a scoring device for providing an indication of the score of the game during the progress of the game.
Figure 8:
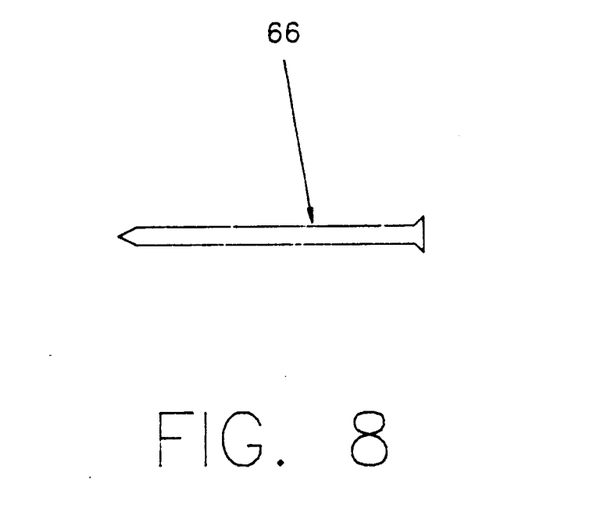
FIG. 8 shows a 'golf-T' type element.
Figure 9:
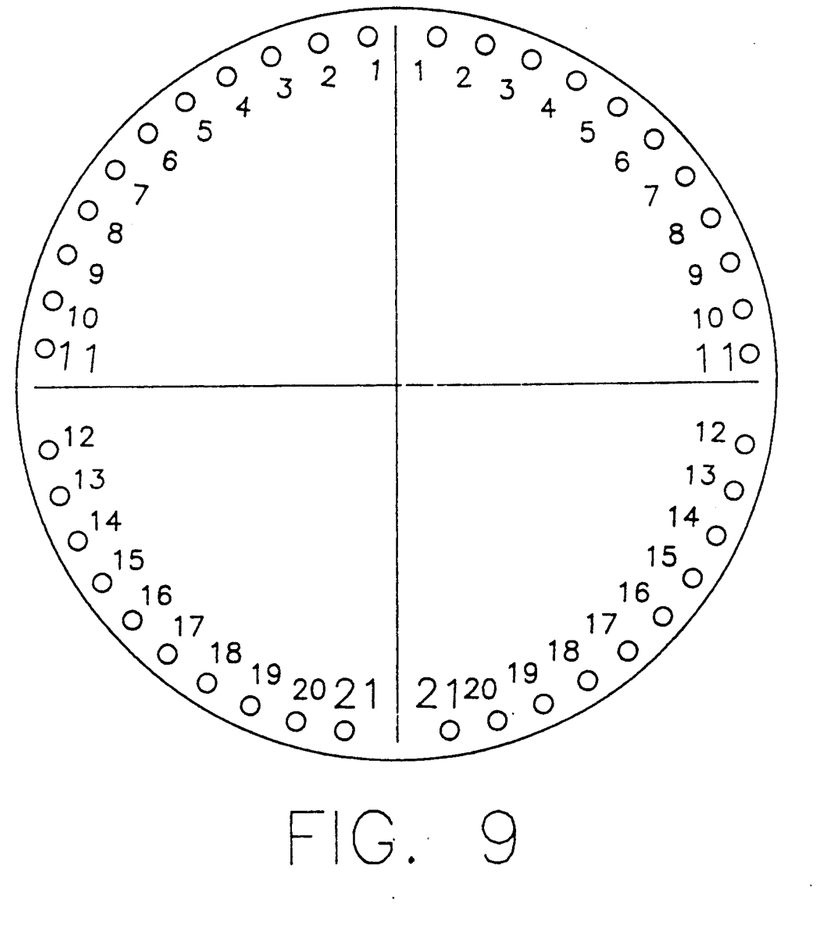
FIG. 9 a scoring device having a circular pattern shown of scoring holes.

In addition to providing an improved measuring device, in accordance with a further aspect of the present invention there is provided a scoring device for providing an indication of the score of the game during the progress of the game. As diagrammatically illustrated in FIG. 7, the device preferably comprises a body 60 of generally flat material, a surface 62 of which has a plurality of holes 64, the holes being sized to receive insertable and removable peg-type elements, diagrammatically shown in FIG. 8 as being 'golf-T' type elements 66, which may be of different colors respectively associated with participants of the game. A sequence of numerical scoring indicia (numbers) 70 are successively placed on the surface in alignment with the holes 64 so that placement of a peg-element in a hole indicates the score of a respective game participant. In the embodiment of FIG. 7, holes 64 are arranged in rows 72 and specified ones of the scoring numbers (e.g. the numbers '11' and '21') associated with prescribed scoring conditions of said game are configured differently (e.g. larger) than other scoring indicia. The holes may be arranged in other patterns, such as a circular pattern shown in FIG. 9.

As will be appreciated from the foregoing description, the measuring device according to the present invention substantially reduces inaccuracies in measurement of the separation of a pitched horseshoe from a target stake, as it is configured to engage the target stake such that surface anomalies in the stake do not influence the accuracy of the measurement. Moreover, the scoring device provides a simple mechanism for providing an indication of the score of the game during the progress of the game.

While I have shown and described several embodiments in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed is:

1. A measuring device for a horseshoe pitching game in which a horseshoe is pitched from a pitching location to generally vertical stake situated in a horseshoe receiving area, said measuring device comprising a generally flat body of material having a generally curved aperture adjacent a first end of said body, the size of said aperture exceeding the width of said stake, so that said device may be placed over said stake, and so that an edge portion of said aperture which is adjacent to said first end of said body may abut against said stake, and a sequence of gradation markings extending along a portion of said body, spaced apart from said first end of said body by said aperture, said sequence of gradation markings extending along a line that intersects said aperture and delineating the distance from a side of said stake that is opposite to the side that abuts against said edge portion of said aperture when said edge portion of said aperture abuts against said stake.

2. A device according to claim 1, wherein said body of material is of a thickness that exceeds the vertical width of a nick that may be formed in the surface of said stake as a result of the impact of a pitched horseshoe.

3. A device according to claim 1, wherein said body of material has an elongated slot that extends from said aperture through said portion of said body along a line in the direction of said gradation markings.

4. A device according to claim 1, wherein said body is made of generally translucent material so as to facilitate alignment of said gradation markings with that edge of a pitched horseshoe which is closest to said stake.

5. A device according to claim 1, wherein said body of material has a pair of side edges that extend generally parallel to said line and wherein said gradation markings extend to said side edges.

6. A device according to claim 5, wherein said portion of said body has a width less than said first end of said body.

7. A device according to claim 5, wherein said body of material has an elongated slot that extends from said aperture through said portion of said body in a direction parallel to said side edges and wherein said gradation markings intersect said elongated slot.

8. A measuring device for a horseshoe pitching game in which a horseshoe is pitched from a pitching location to generally vertical stake situated in a horseshoe receiving area, said measuring device comprising a generally flat body of material having a generally curved opening in a first end of said body, the size of said aperture exceeding the width of a stake, so that said device may be placed against said stake, and so that an edge portion of said opening may abut against said stake, and a sequence of gradation markings extending along a portion of said body, spaced apart from said first end of said body and extending along a line that intersects said aperture and delineating the distance from a side of said stake that abuts against said edge portion of said opening abuts against said stake.

9. A device according to claim 8, wherein said body of material is of a thickness that exceeds the vertical width of a nick that may be formed in the surface of said stake as a result of the impact of a pitched horseshoe.

* * * * *